L. A. HILL.
PNEUMATIC TIRE.
APPLICATION FILED SEPT. 6, 1921.
1,399,556.
Patented Dec. 6, 1921.
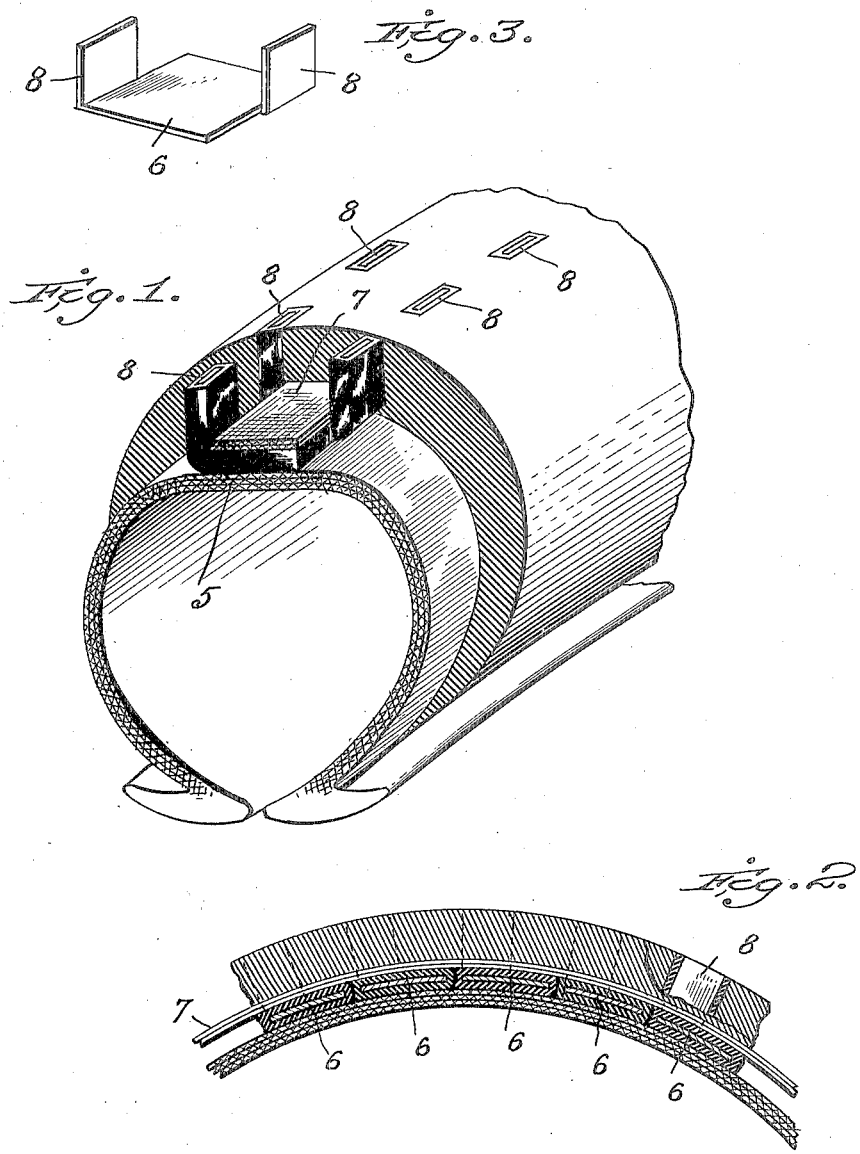

UNITED STATES PATENT OFFICE.

LOUIS A. HILL, OF WASHINGTON, DISTRICT OF COLUMBIA.

PNEUMATIC TIRE.

1,399,556.  Specification of Letters Patent.  Patented Dec. 6, 1921.

Application filed September 6, 1921. Serial No. 498,674.

*To all whom it may concern:*

Be it known that I, LOUIS A. HILL, a citizen of the United States of America, and a resident of the city of Washington, District of Columbia, have invented certain new and useful Improvements in Pneumatic Tires, of which the following is a full and clear specification.

The object of this invention is to provide a non-skid, puncture-proof tread for pneumatic tires, adapted for either the fabric or the cord type of casings now made.

In the drawing—

Figure 1 is a sectional perspective view of a portion of the tire showing my invention applied thereto;

Fig. 2 is a longitudinal sectional view of a portion of the tread;

Fig. 3 is a detail perspective view of one of the tread plates.

The drawing illustrates a pneumatic tire of well-known type except that it is so constructed that the inner wall opposite the tread surface of the tire will be flat, as at 5, whereby, when inflated by the inner tube, there will be produced on the flattened portion 5 a positive outward pressure. Embedded in the tread portion of the tire, centrally thereof and closely adjacent to the fabric layers 5, is a series of flat metal plates 6 whose adjacent edges approximately abut, to thereby form entirely around the tire a puncture-proof band. These plates are held in proper relation to each other during the process of building the tire and also after the tire is built up and vulcanized by means of a fabric band 7 extending entirely around the tire and lying against the outer faces of the plates 6, this band being drawn sufficiently taut in the process of manufacture to hold the plates 6 in proper position during the building up of the remaining portion of the tread, which is done in the usual way.

Each of the plates 6 is provided with a pair of ears 8 at its longitudinal edges, one ear being made at each side edge and the two ears being arranged at opposite ends of the plate 6. These ears 8 extend radially outward and terminate flush with the tread-surface of the tire. This arrangement provides two separated longitudinal rows of metallic anti-skid devices, the devices in one row being staggered with reference to the ones in the other row. These anti-skid metallic elements 8 are desirably narrow and flat and extend longitudinally of the tire, to thereby provide effective road-engaging edges extending practically continuously around the tire. In building these metallic elements in the tire, it is desirable that they shall be first covered by vulcanite, *i. e.*, hard rubber, which of course adheres to the carcass of the tire during vulcanization; in this way, these metallic elements are embedded in the tread in such manner as to prevent the tread rubber from separating from the anti-skid teeth. It will be understood that the metallic elements may be each made of a sheet of steel properly stamped to form the outstanding ears or wings 8.

The portion of the tire in contact with the ground receives the load, which compresses the rubber, while at the same time the air-pressure in the tire forces the separated restricted portions of the tread circumference carrying the non-skid sections downwardly, thereby positively gripping the road-surface. The circumferential band of fabric which holds the series of non-skid metallic elements in place is always under tension from the air-pressure and keeps them constantly in contact with the road-surface, it being obvious that, if the non-skid sections were merely molded in the tread of the tire, pressure on the ground would tend to force them upwardly with depression of the rubber tread. It will be observed also that the non-skid sections cannot be torn from the casing through accident and therefore will function until the tire is worn out.

The nature and scope of the invention having been thus indicated and its preferred embodiment having been specifically described, what is claimed as new is:

1. A pneumatic tire casing having inner fabric bands, metal plates embedded in the tread rubber in a circumferential series extending entirely around the tire, said plates being provided with a double row of projections extending to the tread surface of the tire, and a circumferential restricting fabric band embedded in the tread rubber between said projections, thereby confining the said plates between said restricting band and the inner fabrics of the casing.

2. A pneumatic tire casing having a series of inner fabric bands, another circumferential fabric band embedded in the tread rubber at a distance from said inner bands drawn taut to exert a restrictive action against the expansive tendency exerted by the inner tube, and an annular series of metallic anti-slipping devices clamped between said bands when the tire is inflated, for the purpose set forth.

3. A pneumatic tire casing having a series of inner fabric bands, another circumferential fabric band embedded in the tread rubber at a distance from said inner bands drawn taut to exert a restrictive action against the expansive tendency exerted by the inner tube, and an annular series of metallic anti-slipping devices clamped between said bands when the tire is inflated, for the purpose set forth, said metallic anti-slipping devices being covered by a coating of hard rubber prior to insertion in the tire.

In testimony whereof I hereunto affix my signature.

LOUIS A. HILL.